(12) United States Patent
Vijayasankar et al.

(10) Patent No.: US 8,995,437 B2
(45) Date of Patent: Mar. 31, 2015

(54) TRANSMISSION OF SEGMENTED FRAMES IN POWER LINE COMMUNICATION

(75) Inventors: Kumaran Vijayasankar, Dallas, TX (US); Ramanuja Vedantham, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 468 days.

(21) Appl. No.: 13/415,597

(22) Filed: Mar. 8, 2012

(65) Prior Publication Data
US 2013/0215885 A1 Aug. 22, 2013

Related U.S. Application Data

(60) Provisional application No. 61/601,777, filed on Feb. 22, 2012.

(51) Int. Cl.
*H04L 12/40* (2006.01)
*H04L 12/413* (2006.01)
*H04L 1/16* (2006.01)

(52) U.S. Cl.
CPC ............ *H04L 12/413* (2013.01); *H04L 1/1671* (2013.01)
USPC ............ 370/389; 370/431; 370/437; 370/330

(58) Field of Classification Search
CPC . H04W 74/0816; H04L 69/22; H04L 1/1671; H04L 1/16; H04L 12/413; H04B 2203/5408; H04B 2203/5416; H04B 2203/5433; H04B 2203/5445
See application file for complete search history.

(56) References Cited

U.S. PATENT DOCUMENTS

| | | | | |
|---|---|---|---|---|
| 7,423,992 | B2 * | 9/2008 | Iwamura | 370/330 |
| 7,876,717 | B2 * | 1/2011 | Iwamura | 370/281 |
| 8,537,705 | B2 * | 9/2013 | Afkhamie et al. | 370/252 |
| 8,737,420 | B2 * | 5/2014 | Riedel et al. | 370/437 |
| 2004/0208139 | A1 * | 10/2004 | Iwamura | 370/321 |
| 2007/0025386 | A1 * | 2/2007 | Riedel et al. | 370/445 |
| 2011/0043340 | A1 * | 2/2011 | Kim et al. | 340/310.12 |
| 2013/0251054 | A1 * | 9/2013 | Hui et al. | 375/260 |
| 2014/0269770 | A1 * | 9/2014 | Kenney et al. | 370/474 |

OTHER PUBLICATIONS

Kim et al, A Simulation Study of the PLC-MAC Performance using Network Simulator-2, Ajou University, Korea, 2008, 6 pages.*
"PLC G3 Physical Layer Specification", PLC G3 OFDM, Electricite Reseau Distribution France (ERDF), undated, pp. 1-46.

(Continued)

*Primary Examiner* — Ayaz Sheikh
*Assistant Examiner* — Mounir Moutaouakil
(74) *Attorney, Agent, or Firm* — John R. Pessetto; Frank D. Cimino

(57) ABSTRACT

Segmented frames of data may be transmitted from a transmitting device using conflict free slots (CFS) within a carrier sense multiple access with collision avoidance (CSMA/CA) protocol on a noisy media. At a receiver, a segmented frame of data is received. The data is represented by a plurality of tones. If requested by the transmitter, a tone map response command is prepared that specifies a set of optimized tone map parameters by analyzing the received frame of data. Any previously determined tone map response commands to the transmitting device are deleted. A sequence of frame segments may be received in conflict free slots, but only one tone map response is transmitted to the transmitting device after receiving the entire sequence of frame segments.

13 Claims, 4 Drawing Sheets

(56) References Cited

OTHER PUBLICATIONS

"PLC G3 MAC Layer Specification", PLC G3 OFDM, Electricite Reseau Distribution France (ERDF), undated, pp. 1-138.

"Part 15.4: Wireless Medium Access Control (MAC) and Physical Layer (PHY) Specifications for Low-Rate Wireless Personal Area Networks (WPANs)", IEEE Standard for Information Technology—Telecommunications and Information Exchange Between Systems—Local and Metropolitan Area Networks—Specific Requirements, IEEE Std 802.15.4-2006 (Revision of IEEE std 802.15.4-2003), New York, NY, Sep. 8, 2006, pp. 1-323.

* cited by examiner

TRANSMISSION OF SEGMENTED FRAMES IN POWER LINE COMMUNICATION

CLAIM OF PRIORITY UNDER 35 U.S.C. 119(e)

The present application claims priority to and incorporates by reference U.S. Provisional Application No. 61/601,777, filed Feb. 22, 2012, entitled "G3 Segmentation and Re-Assembly."

FIELD OF THE INVENTION

This invention generally relates to carrier sense multiple access with collision avoidance (CSMA/CA) communication systems, and in particular to communication over power lines.

BACKGROUND OF THE INVENTION

Power Line Communication (PLC) is one of the technologies used for automatic meter reading. Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

BRIEF DESCRIPTION OF THE DRAWINGS

Particular embodiments in accordance with the invention will now be described, by way of example only, and with reference to the accompanying drawings.

Figure 1:
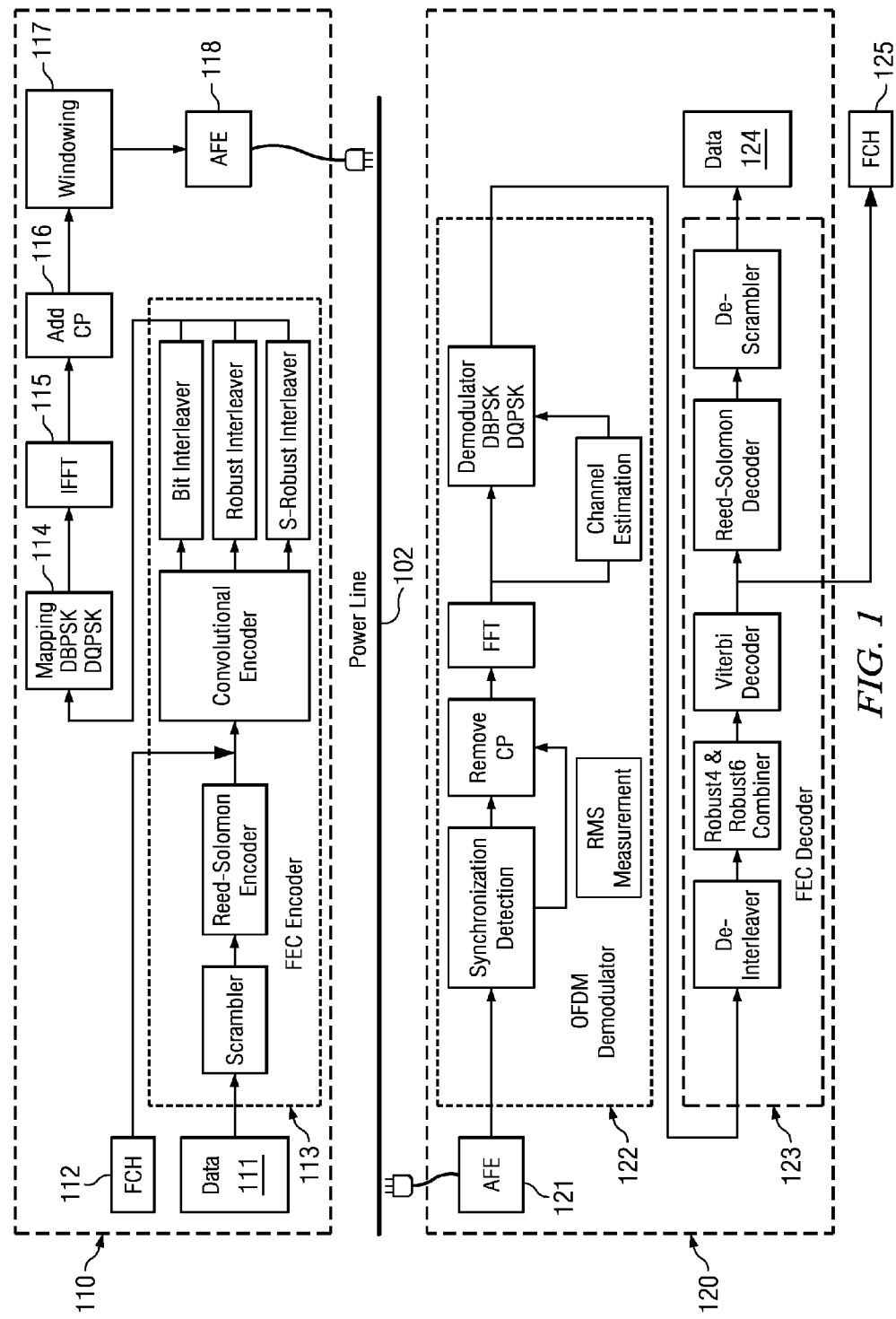
FIG. 1 is a block diagram illustrating a transmitter and receiver for use in power line communication node.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description A set of open standards have been developed for power line communication (PLC) at the request of Electricité Réseau Distribution France (ERDF), a wholly owned subsidiary of the EDF (Electricité de France) Group. The set of standards include "PLC G3 Physical Layer Specification," undated, ERDF, which is incorporated by reference herein; and "PLC G3 MAC Layer Specification," undated, ERDF, which is incorporated by reference herein. These standards are intended to facilitate the implementation of an automatic meter-management (AMM) infrastructure in France; however, PLC using these standards or similar technology may be used by power utilities worldwide.

The G3 standards promote Interoperability and coexists with IEC 61334, IEEE® P1901, and ITU G.hn systems. 10 kHz to 490 kHz operation complies with FCC, CENELEC, and ARIB. CENELEC is the European Committee for Electrotechnical Standardization and is responsible for standardization in the electro technical engineering field. ARIB is a Japanese standards organization.

PLC using G3 standards reduces infrastructure costs by allowing transmission on medium voltage lines, for example, 12 kV, for distances of 6 km or more and across transformers with fewer repeaters. Robust operation over noisy channels is provided by an orthogonal frequency division multiplexing (OFDM)-based PHY (physical) layer. The G3 Mac specification is based on the IEEE 802.15.4-2006 "Wireless Medium Access Control (MAC) and Physical Layer (PHY) Specifications for Low-Rate Wireless Personal Area Networks (WPANs)" which is suitable for lower data rates. Two layers of forward error correction and cyber security features are provided. A 6LoWPAN adaptation layer supports IPv6 packets. An AES-128 cryptographic engine may be included in G3 PLC nodes. Adaptive tone mapping maximizes bandwidth utilization and channel estimation optimizes modulation between neighboring nodes. A mesh routing protocol selects best path between remote nodes.

At the MAC layer, a data or command frame may include up to 400 bytes of data. At the PHY layer, a frame may be segmented and transmitted in smaller chunks of data. The segment size may vary based on transmission channel interference and retry operations. The G3 PLC standard does not clearly indicate how the segmented frames are to be transmitted. One option is to use the Contention Free Slot (CFS) to transmit the segmented frames. The first segment may be transmitted after gaining access to the channel using CSMA/CA. All other segments may then be transmitted in CFS slots following the first frame transmission, as will be described in more detail below. Embodiments of the invention may include an efficient method to control of tone map response during segmented frame transmission, as will be described in more detail below.

FIG. 1 is a block diagram illustrating an OFDM transmitter 110 and receiver 120 for use in a power line communication node for PLC over a power line 102. The power line channel is very hostile. Channel characteristics and parameters vary with frequency, location, time and the type of equipment connected to it. The lower frequency regions from 10 kHz to 200 kHz used in G3 PLC are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize the limited bandwidth specified by CENELEC, and thereby allows the use of advanced channel coding techniques. This combination facilitates a very robust communication over a power line channel.

The CENELEC bandwidth is divided into a number of sub-channels, which can be viewed as many independent PSK modulated carriers with different non-interfering (orthogonal) carrier frequencies. Convolutional and Reed-Solomon coding provide redundancy bits allowing the receiver to recover lost bits caused by background and impulsive noise. A time-frequency interleaving scheme may be used to decrease the correlation of received noise at the input of the decoder, providing diversity.

Data 111 and a frame control header 112 are provided by an application via a media access layer (MAC) of the G3 communication protocol. An OFDM signal is generated by performing IFFT (inverse fast Fourier transform) 115 on the complex-valued signal points that are produced by differentially encoded phase modulation from forward error correction encoder 113 using Reed Solomon encoding. Tone mapping 114 is performed to allocate the signal points to individual subcarriers. An OFDM symbol is built by appending a cyclic prefix (CP) 116 to the beginning of each block generated by IFFT 115. The length of a cyclic prefix is chosen so that a channel group delay will not cause successive OFDM Symbols or adjacent sub-carriers to interfere. The OFDM symbols are then windowed 117 and impressed on power line 102 via analog front end 118. AFE 118 provides isolation of transmitter 110 from the 50/60 Hz power line voltage.

Similarly, receiver 120 receives OFDM signals from power line 102 via AFE 121 that isolates receiver 120 from the 50/60 HZ power line voltage. OFDM demodulator 122 removes the CP, converts the OFDM signal to the time domain using FFT (Fast Fourier Transform), and performs demodulation of the phase shift keyed (DBPSK, DQPSK) symbols. FEC decoder 123 performs error correction using Reed Solomon decoding and then descrambles the symbols to produce received data 124. Frame control header 125 information is also produced by FEC decoder 120, as defined by the G3 PLC standard.

A blind channel estimation technique is used for link adaptation. Based on the quality of the received signal, the receiver decides on the modulation scheme to be used, as defined in the G3 PLC standard. Moreover, the system differentiates the subcarriers with bad SNR (signal to noise ratio) and does not transmit data on them.

Transmitter 110 and receiver 120 may be implemented using a digital signal processor (DSP), or another type of microprocessor, that is executing control software instructions stored in memory that is coupled to the microprocessor, for example, to perform FEP encoding, mapping and OFDM modulation, demodulation and FEP decoding. In other embodiments, portions or all of the transmitter or receiver may be implemented with hardwired control logic, for example. The analog front ends 118, 121 require analog logic and isolation transformers that can withstand the voltage levels present on the power line.

A G3 PLC system is specified to have the ability to communicate in both low voltage (LV) power lines, typically 100-240 VAC, as well as medium voltage (MV) power lines (up to approximately 12 kV, by crossing LV/MV transformers. This means that the receiver on the LV side must be able to detect the transmitted signal after it has been severely attenuated as a result of going through a MV/LV transformer. As the signal goes through the transformer it is expected to experience overall severe attenuation in its power level as well as frequency-dependent attenuation that attenuates higher frequencies. Both transmitter and receiver have mechanisms to compensate for this attenuation. The transmitter has the capability to adjust its overall signal level as well as shape its power spectrum based on tone map information provided by a target receiver, while the receiver has both an analog and digital AGC (Automatic Gain Control) in order to achieve enough gain to compensate for the overall attenuation.

Fundamental System Parameters

G3 PLC supports the portion between 35.9 kHz to 90.6 kHz of the CELENEC-A band. An OFDM with DBPSK and DQPSK modulation schemes per carrier is selected to support up to 33.4 kbps data rate in Normal mode of operation. The DBPSK (differential binary phase shift keying) and DQPSK (differential quadrature phase shift keying) modulation for each carrier makes the receiver design significantly simpler since no tracking circuitry is required at the receiver for coherently detecting the phase of each carrier. Instead, the phases of carriers in the adjacent symbol are taken as reference for detecting the phases of the carriers in the current symbol.

There is potential to use the G3 standard to support communication in frequencies up to 180 kHz. As a result, the sampling frequency at the transmitter and receiver is selected to be 0.4 MHz in order to provide some margin above the Nyquist frequency for signal filtering in the transmitter (for PSD shaping to remove the signal images) and at the receiver (for band selection and signal enhancement).

The maximum number of carriers that can be used is defined to be 128, resulting in an IFFT size of 256. This results in a frequency spacing between the OFDM carriers equal to 1.5625 kHz*(Fs/N), where Fs is the sampling frequency and N is the IFFT size. Note that an imperfection such as sampling clock frequency variation can cause Inter Carrier Interference (ICI). In practice, the ICI caused by a typical sampling frequency variation of about 2% of the frequency spacing, is negligible. In other words, considering ±20 ppm sampling frequency in transmitter and receiver clocks, the drift of the carriers is approximately equal to 8 Hz, which is approximately 0.5% of the selected frequency spacing. Considering these selections, the number of usable carriers for the CELENEC A band is 36, with a first carrier frequency of 35.938 kHz and a last carrier frequency of 90.625 kHz.

The system works in two different modes, namely Normal and Robust modes. In Normal mode, the FEC is composed of a Reed Solomon encoder and a convolutional encoder. The system also supports Reed Solomon code with parity of 8 and 16 Bytes.

In Robust mode the FEC is composed of Reed Solomon and convolutional encoders followed by a Repetition Code (RC). The RC code repeats each bit four times, making the system more robust to channel impairments. This of course will reduce the throughput by about factor of four.

The number of symbols in each PHY (Physical Layer) frame is selected based on two parameters, the required data rate and the acceptable robustness.

CSMA/CA

The channel access is accomplished by using the Carrier Sense Multiple Access with Collision Avoidance (CSMA/CA) mechanism with a random backoff time. The random backoff mechanism spreads the time over which stations attempt to transmit, thereby reducing the probability of collision. Each time a device wishes to transmit data frames, it should wait for a random period. If the channel is found to be idle, following the random backoff, the device may then transmit its data. If the channel is found to be busy following the random backoff, the device waits for another random period before trying to access the channel again.

The current G3 specification supports only an unslotted version of the CSMA-CA algorithm for non-beacon PAN described in IEEE 802.15.4. The random backoff mechanism spreads the time over which stations attempt to transmit, thereby reducing the probability of collision, using a truncated binary exponential backoff mechanism.

Carrier sense is a fundamental part of the distributed access procedure. Physical Carrier Sense (PCS) is provided by the PHY layer upon detection of a preamble in the frame control header. In the latter case, a PCS signal is asserted long enough to be detected and a Virtual Carrier Sense (VCS) is asserted by the MAC. A virtual carrier sense mechanism is provided by the MAC by tracking the expected duration of channel occupancy. Virtual carrier sense is set by the length of received packet or upon collision. In these cases, virtual carrier sense tracks the expected duration of the Busy state of the medium. The medium is to be considered Busy when the station is transmitting.

A VCS timer is maintained by all stations to improve reliability of channel access. The VCS timer is set based on received long (data) or short (ACK) frames. The VCS timer is also set upon collision or when the station powers up. Stations use this information to compute the expected Busy condition of the medium or the expected duration of the Contention State and store this information in the VCS timer.

A Collision occurs in each of the following circumstances: the transmitting station receives a something other than ACK or NACK response when a response is expected. The transmitting station must infer a Collision from the absence of any response to a transmission when a response is expected. Note that the absence of a response could also be the result of a bad channel. Since there is no way to distinguish between the two causes a Collision is inferred.

Figure 2:
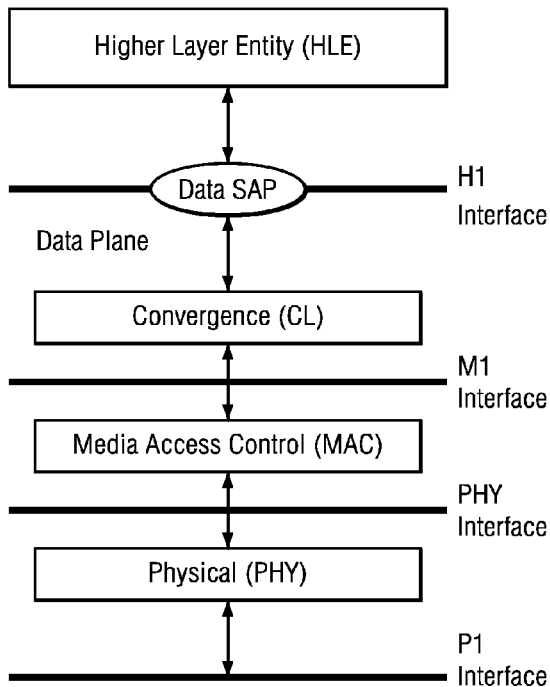
FIG. 2 illustrates protocol layers used to control the PLC node of FIG. 1.

FIG. 2 illustrates protocol layers that may be used to control the PLC node of FIG. 1. The Higher Layer Entities (HLEs) above the H1 (Host) Interface may be bridges, applications or servers that provide services, such as a meter reading service, to clients below the H1 Interface. The Data Service Access Point (SAP) may accept Ethernet format packets to allow operation with IP based protocols. The data SAP plane provides the traditional layered approach with the M1 interface between the Convergence Layer (CL) and the MAC, and the PHY interface between the MAC and the PHY.

FIGS. 3-6 illustrate various G3 PLC transmission sequences. Time intervals between frames on the medium constitute Interframe Space (IFS) and are necessary due to propagation and processing time. Three interframe space values are defined in the G3 standard. Contention Interframe Space (CIFS) occurs after the end of the previous transmission. The second defined interval is the Response Interframe Space (RIFS). A third defined interval is the Extended Interframe Space (EIFS).

RIFS is the time between the end of a transmission and the start of its associated response. If no response is expected, the CIFS is in effect. An EIFS is defined for conditions when the station does not have complete knowledge of the state of the medium. This can occur when the station initially attaches to the network, when errors in the received frames make them impossible to decode unambiguously. If a packet is received and correctly decoded before the expiration of the EIFS, then the EIFS is cancelled. The EIFS is significantly longer than the other interframe spaces, providing protection from Collision for an ongoing frame transmission or segment burst when any of these conditions occur. The EIFS is calculated as follows:

$$aEIFS=aAckTime+aCIFS+aRIFS+MaxFrameSize*aSymbolTime$$

Figure 3:
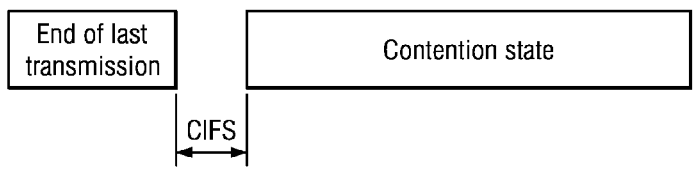
FIGS. 3-6 illustrate various PLC transmission sequences.
Figure 4:
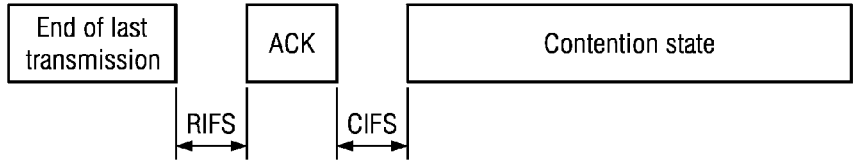
Figure 5:
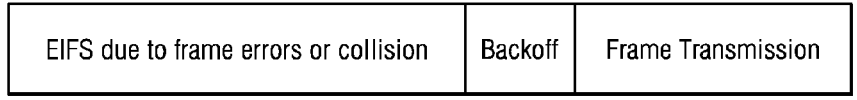

FIG. 3 illustrates CIFS if no response is expected. FIG. 4 illustrates RIFS and CIFS along with an ACK response when a response is expected. FIG. 5 illustrates EIFS due to frame errors or collision.

Priority

Figure 6:
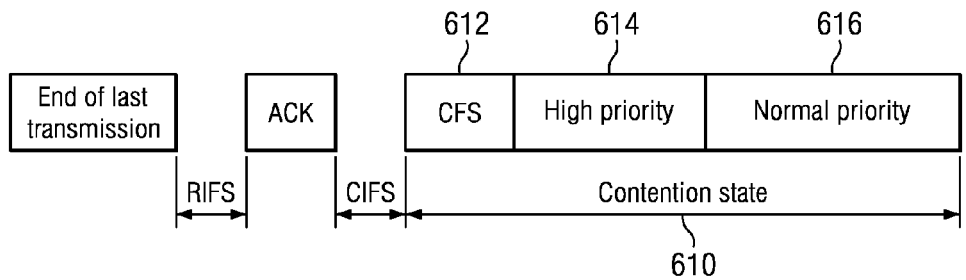

Prioritized access to the channel can be beneficial for real time application or control application when urgent message should be delivered as soon as possible. Only two levels of priority (High and Normal) are currently included in the G3 specification to minimize complexity. Priority resolution is implemented by using two contention time windows during contention state as shown in FIG. 6. A first slot of contention window 610 is called a Contention Free Slot (CFS) 612. It is used to implement packet bursting without backoff procedure in order to prevent possible interruption from other nodes. The high and normal priority stations will compete for channel during HPCW (high priority contention window) 614 and NPCW (normal priority contention window) 616 correspondingly. Since HPCW is located before NPCW, high priority stations will get access to the channel before stations with normal priority. Duration of HPCW and NPCW are calculated as follow:

$$HPCW\ time=macHighPrioirtyWindowSize*aSlotTime;$$

$$NPCW\ time=(2_{maxBE}*aSlotTime)-HPCW\ time;$$

$$CFS\ time=aSlotTime;$$

ARQ

ARQ (Automatic Repeat reQuest) is implemented based on acknowledged and unacknowledged retransmission. The MAC uses a response type as part of its ARQ mechanism. ACK is a traditional positive acknowledgment that when received allows the transmitter to assume successful delivery of the frame. The negative acknowledgment (NACK) is used to inform a packet originator that the receiver received the packet but it was corrupted. A successful reception and validation of a data can be confirmed with an acknowledgment. If the receiving device is unable to handle the received data frame for any reason, the message is not acknowledged.

If the originator does not receive an acknowledgment after a waiting period, it assumes that the transmission was unsuccessful and retries the frame transmission. If an acknowledgment is still not received after several retries, the originator can choose either to terminate the transaction or to try again. When the acknowledgment is not required, the originator assumes the transmission was successful. When acknowledgment is not required, the originator may retransmit the same packets several times to increase probability of data delivery. The receiver should be able distinguish and discard redundant copies using a Sequence Number and Segment Count that is included in the frame header. A retransmitted packet will have the same Sequence Number and Segment Count as the original packet.

Segmentation and Reassembly Overview

The G3 PHY specification supports different types of modulation and tone maps. Therefore, a number of data bytes of PHY payload can be changed dynamically based on channel condition. This requires implementing MAC payload fragmentation on the MAC sub-layer. If the MAC payload is too large to fit wholly within an MSDU (MAC service data unit), it must be partitioned into smaller segments that can each fit within an MSDU. This process of partitioning MAC frame into MSDUs is called segmentation. The segmentation may require adding padding bytes to the last segment in order fill the last PHY frame. The reverse process is called reassembly. The segmentation improves the probability of delivery over harsh channels and contributes to better latency characteristics for all stations by restricting the length of each individual transmission.

All forms of addressed delivery (unicast, multicast, and broadcast) are subject to segmentation. Acknowledgments and retransmissions occur independently for each segment. The Segment Control fields: SL, SC and LSF are used to keep track of segments of fragmented packet and assembly whole packet on receiver side.

Figure 7:
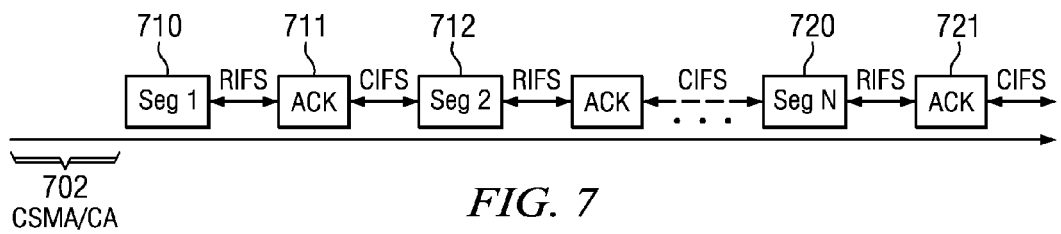
FIG. 7 illustrates segmented PLC transmission in conflict free slots.

FIG. 7 illustrates segmented PLC transmission in conflict free slots. The G3 standard does not clearly indicate how the segmented frames are to be transmitted. One option is to use the Contention Free Slot (CFS) to transmit the segmented frames. The first segment 710 will be transmitted after gaining access to the channel using CSMA/CA 702. All other segments will be transmitted in the CFS slot following the first frame transmission. After each segment, such as segment 710, an ACK 711 will be received. A next segment, such as segment 712 will then be immediately transmitted in a CFS after a CIFS time period. This process continues until the last segment 720 is transmitted and acknowledged 721.

Segmentation and re-assembly may involve the following aspects: encryption of segmented frames; retransmission schemes, and an effective method to perform tone map response.

Encryption of Segmented Frames:

One option is to encrypt the frame before segmentation and then segment the encrypted frames. In this case, the Auxiliary security header will have the same frame counter value for all the segmented frames and hence the same Auxiliary security header will be placed in each segment. Optionally, an embodiment may avoid the inclusion of Auxiliary security header in all segments except the first or last segment.

A second option is to first perform segmentation. Encryption will be performed only on the segmented frame. The receiver will first decrypt each segment and then will combine them to complete the reassembly procedure.

Retransmission Schemes:

While transmitting unicast frames, an ACK will be expected for each of the segments. If an ACK is not received, then the segment has to be retransmitted. Two methods will now be described to handle the retransmissions of the segmented frames.

Figure 8:
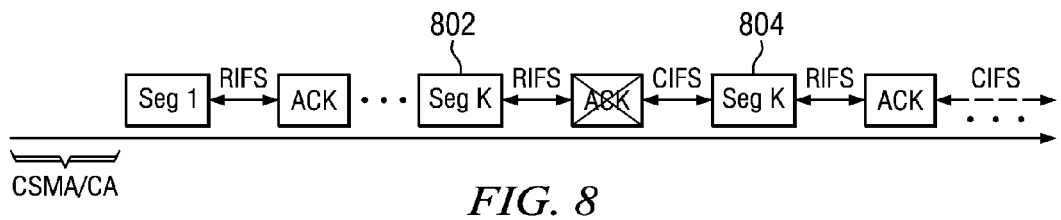
FIGS. 8-9 illustrate retransmission sequences.

Retransmission 804 of a lost segment 802 during the CFS slot following the EIFS is illustrated in FIG. 8. It may be inferred that segment 802 is lost when an ACK is not received after an RIFS time period.

Figure 9:
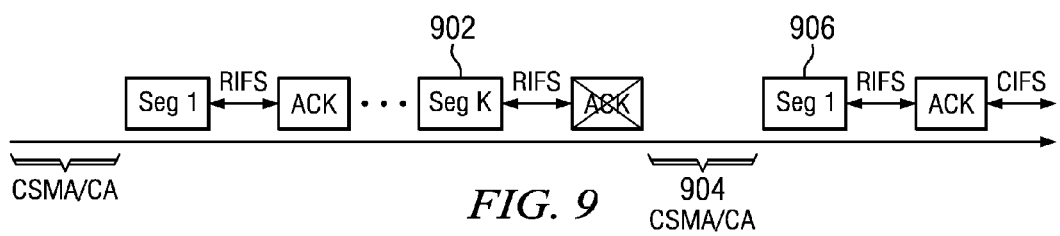

FIG. 9 illustrates another option for retransmission in which a new CSMA/CA contest 904 is performed after loss of segment 902, indicated by not receiving an ACK. In this example, retransmission of the segmented frame will start from the beginning (first segment) 906.

Tone Map Procedure:

A Tone Map procedure is defined in the G3 standard which enables a transmitter to select a modulation scheme and tone map to be used for a transmission to a particular receiver. This is achieved by setting the TMR bit to 1 in any data frame sent to the receiver. The receiver, upon receiving a frame with the TMR bit is set, will generate and transmit a tone map response frame to inform the sender of the modulation scheme and tone map to be used for subsequent transmissions. Table 1 illustrates placement of the TMR bit in the segment control word that is included in the frame header of each segment.

TABLE 1

Segment control fields:

| Field | Byte | Bit number | Bits | Definition |
| --- | --- | --- | --- | --- |
| RES | 0 | 7-4 | 4 | Reserved |
| TMR | 0 | 3 | 1 | Tone map request:<br>1: Tone map is requested<br>0: Tone map is not requested |
| CC | 0 | 2 | 1 | Contention Control:<br>0: contention is allowed in next contention state<br>1: contention free access |
| CAP | 0 | 1 | 1 | Channel access priority:<br>0: Normal<br>1: High |
| LSF | 0 | 0 | 1 | Last Segment Flag is set for last segment only |
| SC | 1 | 7-2 | 6 | Segment Count |
| SL[9-8] | 1 | 1-0 | 2 | Segment Length of MAC frame |
| SL[7-0] | 2 | 7-0 | 8 | Segment Length of MAC frame |

In the special case of transmitting segmented frames using CFS slot transmissions, even if the TMR bits is set, the receiver will not get a chance to transmit until all of the segments are transmitted by the transmitter because the segmented frames use CFS transmissions. If the receiver generates a Tone Map Response for each segment, there may be too many TMR frames generated to be transmitted to the same node. However, if the TMR bit is not set then the transmitter cannot get the channel information.

Several schemes may be used separately or together to overcome the problem of too many TMR frames while transmitting segmented frames using CFSs. The receiver may delete any previously generated Tone Map Response frame to the same destination when it is requested to prepare a new TMR by a new incoming frame with TMR bit set from the same destination.

Transmitter behavior may also be modified to reduce the number of TMR requests. If the transmitter uses the option to retransmit the lost frames after a CFS period as shown in FIG. 8, it may set the TMR bit only in the last segment. This will avoid requesting the receiver to generate too many tone map response frames that may not even be transmitted.

If the transmitter uses the option to retransmit by using a CSMA/CA after a lost segment, as shown in FIG. 9, then it may set the TMR bit in each segment, since now the receiver may have the opportunity to send the tone map response payload frame after a transmitted segment gets lost. The tone map response information may prove useful for a successful retransmission. In this case, the receiver may discard successive TMR requests from the same transmitter and only transmit a most recent TMR when the CSMA/CA event occurs, as described above.

The MAC sublayer of the receiver generates a Tone Map Response command if Tone Map Request (TMR) bit of received packet Segment Control field is set. It means that a packet originator requested tone map information from destination device. The destination device has to estimate this particular communication link between two points and choose optimal PHY parameters. The tone map information includes the index associated with PHY parameters: number of used tones and allocation (Tone Map), modulation mode and TX power control parameters. The Tone Map Response message parameters are described in Table 2.

TABLE 2

Tone Map Response payload

| Field | Byte | Bit number | Bits | Definition |
|---|---|---|---|---|
| TXRES | 0 | 7 | 1 | Tx Gain resolution corresponding to one gain step. 0: 6 dB 1: 3 dB |
| TXGAIN | 0 | 6-3 | 4 | Desired Transmitter gain specifying how many gain steps are requested. |
| MOD | 0 | 2-1 | 2 | Modulation type: 0—ROBO; 1—DBPSK 2—DQPSK |
| TM[8] | 0 | 0 | 1 | Tone Map [8] |
| TM[0:7] | 1 | 7-0 | 8 | Tone Map [7:0] |
| LQI | 2 | 7-0 | 8 | Link Quality Indicator |
| TXCOEF[3:0] | 3 | 7-4 | 4 | Specifies number of gain steps requested for 10 kHz-20 kHz spectrum |
| TXCOEF[7:4] | 3 | 3-0 | 4 | Specifies number of gain steps requested for 20 kHz-30 kHz spectrum |
| TXCOEF[11:8] | 4 | 7-4 | 4 | Specifies number of gain steps requested for 30 kHz-40 kHz spectrum |
| TXCOEF[15:12] | 4 | 3-0 | 4 | Specifies number of gain steps requested for 40 kHz-50 kHz spectrum |
| TXCOEF[19:16] | 5 | 7-4 | 4 | Specifies number of gain steps requested for 50 kHz-60 kHz spectrum |
| TXCOEF[23:20] | 5 | 3-0 | 4 | Specifies number of gain steps requested for 60 kHz-70 kHz spectrum |
| TXCOEF[27:24] | 6 | 7-4 | 4 | Specifies number of gain steps requested for 70 kHz-80 kHz spectrum |
| TXCOEF[31:28] | 6 | 3-0 | 4 | Specifies number of gain steps requested for 80 kHz-90 kHz spectrum |

Figure 10:
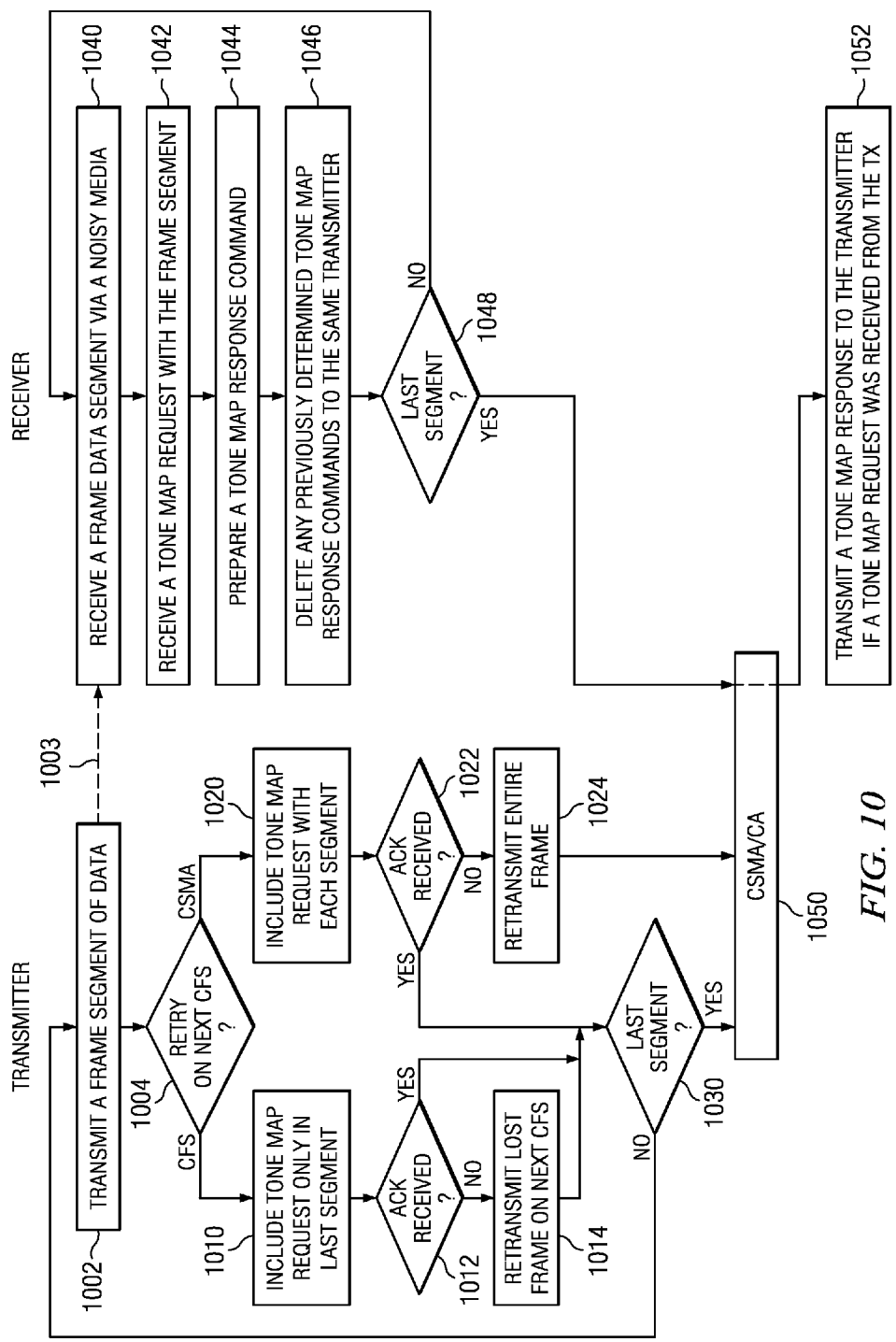
FIG. 10 is a flow chart illustrating tone map request operation.

FIG. 10 is a flow chart illustrating tone map request operation. On reception of Tone Map Response command frame, the MAC layer of the transmitter updates a "neighbor table" with the corresponding Tone Map and communication parameters for that neighbor device. If no entry already exists in the table for that device a new entry should be added, based on implementation dependant limitations.

When a station is ready to transmit data, it will first check if the neighbor table already has a record related to the destination device address. If the record does not exist or is aged, as specified by an age counter, the MAC sublayer sets TMR bit of an outgoing packet Segment Control field and requests new Tone Map information. In this case the MAC data should be sent in ROBO mode.

If a neighbor table record exists and it is not aged the MAC sublayer does not need to send Tone Map Request message. In this case MAC sublayer uses information from the neighbor table to properly configure PHY TX (transmission) and construct a Frame Control Header for an outgoing frame.

When the destination station receives a data frame it will check the Tone Map Request bit in the Segment Control field. If the bit is set, the destination station measures the per-tone quality of the channel, constructs and sends a Tone Map Response command message back to the originator station. The destination station does not send a Tone Map Response message if the Tone Map Request bit is not set. The Tone Map Response message is transmitted using default ROBO modulation. The destination device PHY uses parameters from the Frame Control Header to decode the MAC data fields.

The destination station will attempt to send a Tone Map Response message as soon as possible after receiving a Tone Map Request message from the source station.

If the source station receives a Tone Map Response message it will update a neighbor table record related to the destination address with the new Tone Map, modulation and TX gain parameters. If a record does not exist, the MAC sublayer will create a new one. The Age counter should be set to desired value. After receiving a Tone Map Response message, a station will begin to use the updated neighbor table information for all transmissions to the associated destination.

If the source station does not receive a Tone Map Response message after transmitting a Tone Map Request message to a certain destination, it sets the Tone Map Request bit in the Segment Control of the next MAC data frame that it wants to transmit to the same destination. In other words, the MAC sublayer will continue to transmit a Tone Map Request message to the same destination.

The MAC sublayer does not send a Tone Map Request message to the destination device if no data is sent to this device.

Referring again to FIG. 10, a transmitter, such as transmitter 110 (referring to FIG. 1), in a PLC node begins to transmit a sequence of segmented frames after consulting its neighbor table. A first frame segment is transmitted 1002 via a noisy media 1003 which is received 1040 by a receiver in another PLC node, such as receiver 120 of FIG. 1. If the transmitter is configured to perform retries on a next CFS 1004, then it will include a tone map request, if needed by the neighbor table, but only in one frame segment 2010. In some embodiments, the one tone map request may be included in the last frame segment. In another embodiment, the one tone map request may be included in the first frame segment, or in one of the mid frame segments. However, if the transmitter is configured 1004 to perform retries after a CSMA/CA contest, then it will include a tone map request with each frame segment, if needed by the neighbor table. In some embodiments, a transmitter may be designed to always perform retries in either one mode of operation or the other mode of operation. In other embodiments, the transmitter may be configurable to perform retries in different modes of operation at different times, based on network conditions, for example.

When the transmitter is configured to retry on a next CFS, it will perform the retransmission immediately after determining that an ACK was not received 1012. When an ACK is received 1012, the transmitter will then repeat the process to send the next segment in the next CFS, unless the last segment has been transmitted 1030. In this case, the transmitter relinquishes the channel and another CSMA contest 1050 may begin.

When an ACK is received 1022, the transmitter will then repeat the process to send the next segment in the next CFS, unless the last segment has been transmitted 1030. In this case, the transmitter relinquishes the channel and another CSMA contest 1050 may begin.

When the transmitter is configured to resend the complete sequence of frame segments when a ACK is not received, it may wait for the next CSMA contest 1050 after determining that an ACK was not received 1022. In this manner, it may receive an updated TMR command from the receiver to allow it to adjust transmission to current channel conditions. The transmitter may be configured to wait for a period of time to allow the receiver to gain access to the channel and transmit the TMR command. However, in some embodiments, the transmitter may not wait for reception of a TMR command before retransmitting the complete sequence of frame segments.

The receiver receives 1040 each segmented frame from noisy media 1003. It may also receive a tone map request with the frame segment, based on the configuration of the transmitter and its need for a TMR update based on its neighbor table, as discussed above.

When it receives 1042 a tone map request, it then prepares a tone map response command 1044, as discussed above with reference to Table 2. It will delete 1046 any previously determined tone map response command to the same transmitter that has not yet been transmitted. As discussed above, when receiving frame segments on CFSs, the receiver does not have a chance to enter a CSMA contest and then transmit the TMR command.

The process repeats 1048 until the last frame segment is received. Once the last segment has been received 1048, then the receiver transmits 1052 only the one remaining TMR command after winning a CSMA/CA contest 1050.

Other Embodiments

While the invention has been described with reference to illustrative embodiments, this description is not intended to be construed in a limiting sense. Various other embodiments of the invention will be apparent to persons skilled in the art upon reference to this description. For example, while the G3 specification was discussed herein, other PLC protocols may make use of the segmented frame transmission operation described herein.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. A stored program in an onboard or external (flash EEP) ROM or FRAM may be used to implement aspects of the OFDM signal processing. Analog-to-digital converters and digital-to-analog converters provide coupling to power line network.

In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for transferring frames of data using carrier sense multiple access with collision avoidance (CSMA/CA) on a noisy media, the method comprising:
   receiving a frame of data via the noisy media from a transmitting device, wherein the data is represented by a first plurality of tones;
   receiving a tone map request with the frame of data;
   preparing a first tone map response command that specifies a set of optimized tone map parameters by analyzing the received frame of data; and deleting all previously determined tone map response commands to the transmitting device;
transmitting a sequence of segmented data frames via the power line to a receiver using a plurality of conflict free slots in the CSMA/CA protocol, wherein the data is represented by a second plurality of tones;
receiving an acknowledgment from the receiver for each correctly received segmented data frame;
retransmitting a segmented data frame when an acknowledgement is not received; and
including a second tone map request with only a last one of the frame of data if a segmented data frame is retransmitted on an immediately subsequent conflict free slot in a first mode of operation.

2. The method of claim 1, further comprising:
receiving a sequence of segmented frames in conflict free slots; and
transmitting only one tone map response to the transmitting device after receiving the entire sequence of segmented frames.

3. The method of claim 2, wherein a tone map request is included only in a last frame of the sequence of segmented frame.

4. The method of claim 2, further comprising:
assembling the sequence of segmented frames to form a complete frame of data; and
decrypting the complete frame of data.

5. The method of claim 2, further comprising:
decrypting each frame of the sequence of segmented frames to form a sequence of decrypted frame segments; and
assembling the sequence of decrypted frame segments to form a complete frame of data.

6. The method of claim 1, wherein the noisy media is a high voltage power line.

7. The method of claim 1, further comprising queuing the tone map response for transmission to the transmitting device after winning a CSMA/CA conflict contest.

8. A power line communication (PLC) device comprising:
a receiver, wherein the receiver comprises;
first analog front end configured to receive orthogonal frequency division multiplexing (OFDM) symbols from a power line; and
an OFDM demodulator, wherein the receiver is configured to:
receive a frame of data via the power line from a transmitting device, wherein the data is represented by a plurality of tones;
receive a tone map request with the frame of data;
prepare a tone map response command that specifies a set of optimized tone map parameters by analyzing the received frame of data; and
delete all previously determined tone map response commands to the transmitting device;
a transmitter, wherein the transmitter comprises:
a second analog front end configured to couple the OFDM symbols to the power line;
a modulator configured to produce the OFDM symbols representative of data, wherein the transmitter is configured to:
transmit a sequence of segmented data frames via the power line to another receiver using a plurality of conflict free slots in the CSMA/CA protocol, wherein the data is represented by a plurality of tones;
receive an acknowledgment from the receiving device for each correctly received segmented data frame;
retransmit a segmented data frame when an acknowledgement is not received; and
include a tone map request with only a last one of the frame of data if a segmented data frame is retransmitted on an immediately subsequent conflict free slot in a first mode of operation.

9. The PLC device of claim 8, wherein the receiver is further configured to:
receive a sequence of segmented frames in conflict free slots of a carrier sense multiple access with collision avoidance (CSMA/CA) protocol; and
transmit only one tone map response to the transmitting device after receiving the entire sequence of segmented frames.

10. The PLC device of claim 8, wherein a tone map request is included only in one frame of the sequence of segmented frame.

11. The PLC device of claim 9, wherein a tone map request is included only in a last frame of the sequence of segmented frames.

12. The PLC device of claim 8, wherein the transmitter is further configured to:
dynamically configure the transmitter to a second mode of operation to retransmit one or more of the sequence of segmented data frames only after another CSMA/CA contest; and
include a tone map request with each of the plurality of segmented data frames while the transmitter is configured in the second mode.

13. The PLC device of claim 8, wherein the analog front ends are configured to interface with a power line that carries up to approximately 13 kV.

* * * * *